United States Patent [19]

Singer

[11] 4,067,545
[45] Jan. 10, 1978

[54] DEVICE FOR THE BRAKING OF TOWING CABLES IN TOW-TYPE SKI LIFTS

[75] Inventor: Hans Singer, Obere Dorfstr. 260 8101 Unterammergau, Germany

[73] Assignees: Joseph Reiter; Hans Singer, both of Schlegldorf, Germany

[21] Appl. No.: 575,238

[22] Filed: May 7, 1975

[30] Foreign Application Priority Data

May 8, 1974 Germany .............................. 2422112

[51] Int. Cl.² ................................................. A62B 1/12
[52] U.S. Cl. .............................. 254/160; 104/173 ST; 188/296
[58] Field of Search .................... 254/158, 162, 187 G, 254/166, 160; 105/132; 188/296; 104/173 ST

[56] References Cited

U.S. PATENT DOCUMENTS

| | | | |
|---|---|---|---|
| 526,679 | 10/1894 | Blount | 254/160 |
| 2,553,090 | 5/1951 | Holley | 254/160 |
| 3,307,494 | 3/1967 | Samitz | 104/173 ST |
| 3,481,148 | 12/1969 | Muller et al. | 188/296 X |
| 3,587,474 | 6/1971 | Fuchs | 104/173 ST |
| 3,702,177 | 11/1972 | Niemkiewicz et al. | 188/296 X |

Primary Examiner—Robert J. Spar
Assistant Examiner—Donald W. Underwood
Attorney, Agent, or Firm—Bacon & Thomas

[57] ABSTRACT

A device for differentially braking a towing cable in a tow-type ski lift comprises a drum for carrying the towing cable, spring biasing means associated with the drum for biasing the drum in a cable winding or retraction direction, and a turbine-type hydraulic brake means for differentially braking the withdrawal and retraction motions of the tow cable, said hydraulic braking means comprising a bladed fluid impeller means rotatable with said drum and including a first and second set of impeller blade members, and a pair of stator discs having two sets of stator blade members cooperatively arranged adjacent the two sets of impeller blade members, one set of cooperating impeller and stator blade members being smaller in a radial sense than the other set of impeller and stator blade members, and the two sets being inclined relative to the axis of rotation of the impeller such that the braking action that occurs during cable withdrawal is greater than during cable retraction.

5 Claims, 3 Drawing Figures

DEVICE FOR THE BRAKING OF TOWING CABLES IN TOW-TYPE SKI LIFTS

The invention pertains to a device for the braking of towing cables in tow-type ski lifts in connection with which the towing cable is withdrawable from a cable drum against the force of a draw spring and is retractable by means of the draw spring. For the braking of the towing cable during retraction or withdrawal, a hydraulic braking effect occurs which is produced by a turbine-type pump impeller which rotates with the cable drum and the blades of which are arranged opposite the blades of a stationary turbine wheel or stator disc.

Devices of this type are already known (German Offenlegungsschrift No. 2,206,851). However, they have the disadvantage that the braking torques produced via the hydraulic brake in the retraction direction and in the withdrawal direction are equal. The braking torque of the hydraulic brake, which is desired to be strong principally in the withdrawal direction, must be overcome by the draw spring during retraction of the towing cable. For this reason, the draw spring must be correspondingly strongly designed. Accordingly, however, the total braking power during withdrawal, which is comprised of the power of the draw spring and the braking torque of the hydraulic brake, becomes nevertheless dependent to a very considerable degree upon the properties of the draw spring, a result which, however, should precisely be avoided by an hydraulic brake. In other words, an hydraulic brake having the same braking torque in the retraction and the withdrawal direction is either designed so that its braking torque is proportioned to the relatively high load in the withdrawal direction resulting from towing a person who is drawn along by a tow bar on the end of the towing cable, or, on the other hand, the hydraulic brake is designed so that the braking torque corresponds to the requirements during retraction of the tow bar. In the former case, the braking torque is too large with respect to the recoil power of the recoil spring, i.e., the retraction operation takes place too slowly or not at all, and in the latter case, a striking of the tow bar against the housing of the device is barely prevented, but an easy retraction by means of the draw spring is assured. In the latter case, it is also too small for the loading in the withdrawal direction, therefore, too small for smooth towing of a person.

The invention is based upon the recognition of these disadvantages, and from these disadvantages arises the problem of providing a device of the type initially mentioned which does not possess these disadvantages, and one having an hydraulic brake, which, on the contrary, is designed in such a manner that the braking moment in the withdrawal direction is proportioned to the relatively high load arising during withdrawal when the torque is relatively high, and, the braking torque in the retraction direction is smaller when the torque is lower.

This problem is solved by means of the provision that the blades of the set of blades on the pump impeller which rotates with the cable drum and the blades of the stator are inclined with respect to the axis of rotation of the pump impeller.

As a result of this inclination, the result is achieved that in one direction of rotation of the pump impeller a very high braking torque arises, and in the other direction of rotation, a very small braking torque is produced. If one designs the inclination of the blades with an angle of between about 25° and 35°, preferably approximately 30°, there results an optimally high braking torque in the cable withdrawal direction. One advantageous further development of the invention provides that a braking torque adjusted exactly to the retraction operation is produced by means of additional sets of blades, one of which is preferably positioned on the same pump impeller.

In order to achieve a gradual build-up of the braking torque during low revolution values of the pump impeller, it is provided in accordance with a further advantageous development of the invention that the middle regions of the set of blades on the pump impeller and also of the stationary turbine wheel are covered by separator plates, so that a momentum exchange takes place only when the hydraulic fluid has been accelerated in the radial direction.

Further advantageous developments will become apparent from the following description of a specific embodiment, when considered in view of the accompanying drawings. In the drawings.

Figures 1, 2:
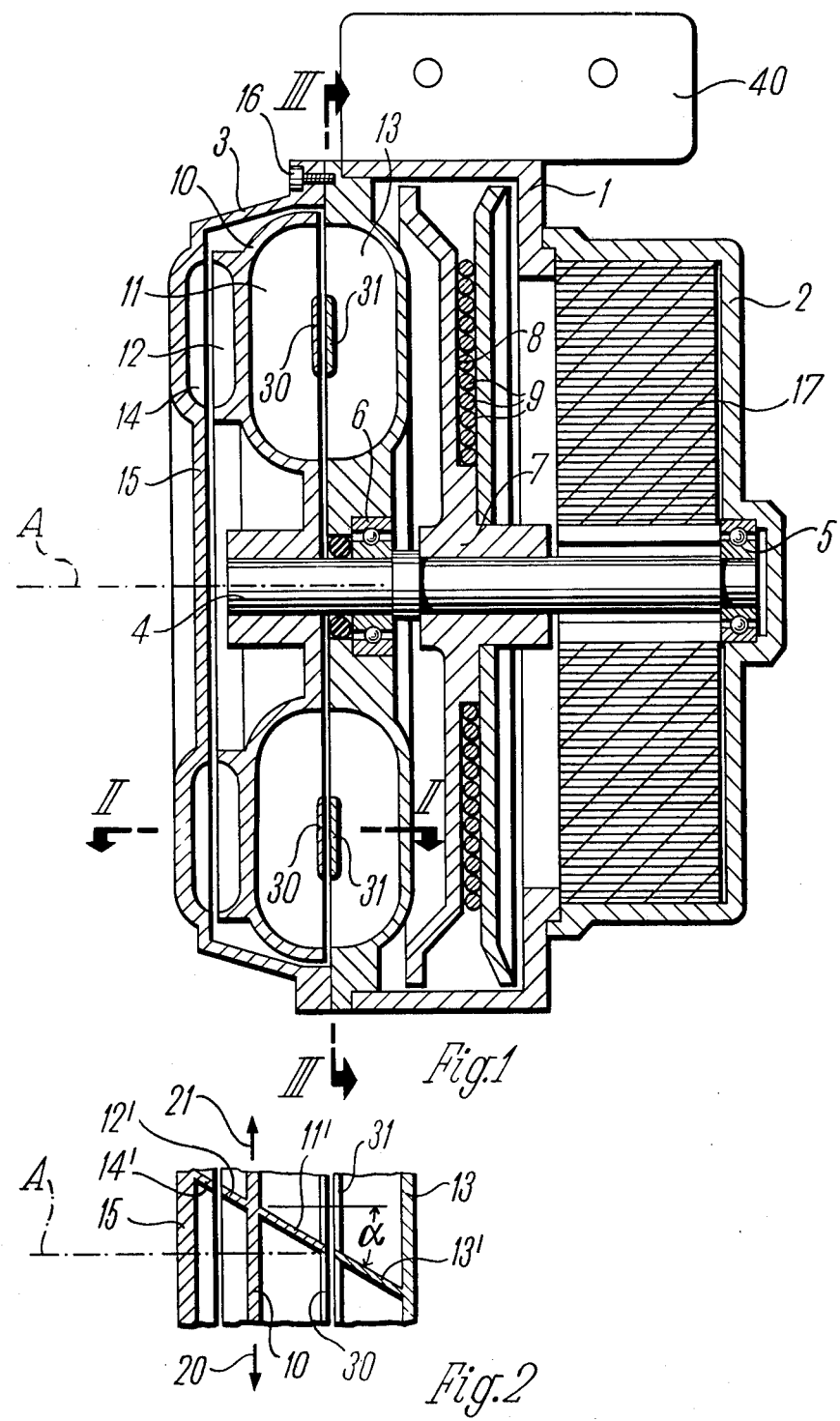
FIG. 1 is a cross-section through an embodiment of the invention.
FIG. 2 is a sectional view taken along the line II—II in FIG. 1.
Figure 3:
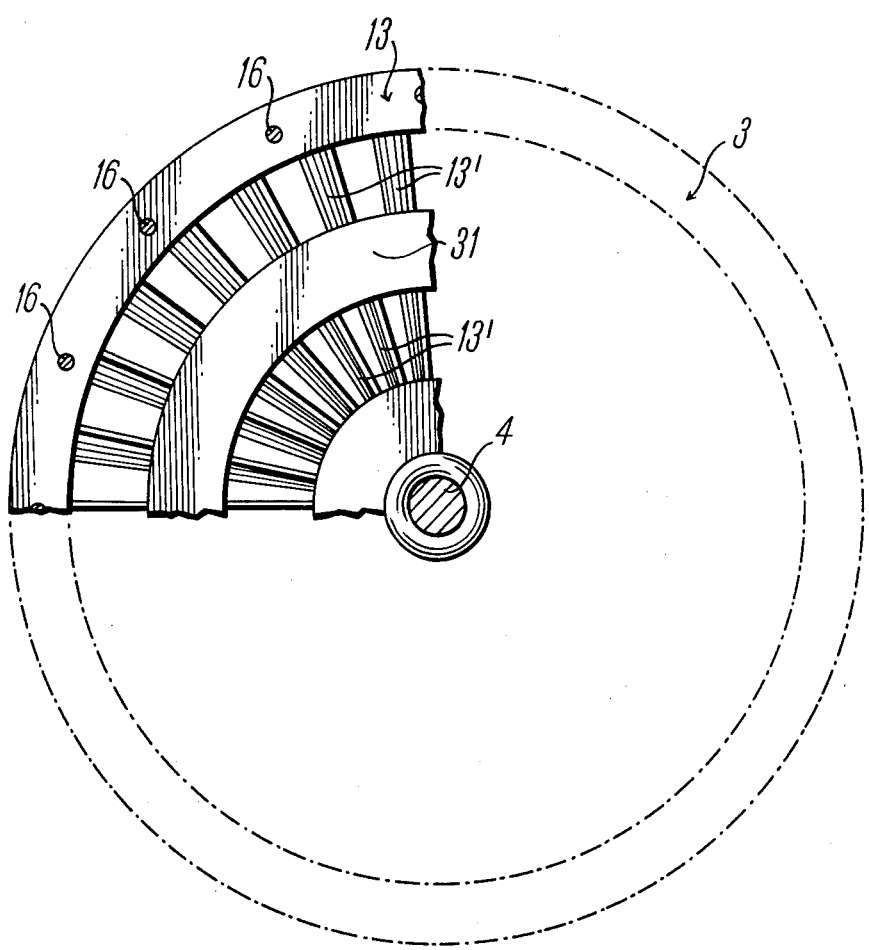
FIG. 3 is a sectional view taking along the line III—III in FIG. 1.

The towing device is formed from a housing 1, with which a housing cover 2 and a stationary turbine wheel or stator disc 3 are tightly screwed together. A shaft 4 is rotatably mounted with the aid of a bearing 5 in the housing cover 2 and with the aid of a bearing 6 in the stator 3. With the shaft 4 there is firmly joined a cable drum 7, which is formed from two pieces, whereby between both pieces a space 8 is created, which serves for receiving the towing cable 9. The towing cable 9 is itself firmly anchored in the cable drum 7; during rotation of the drum in one direction, the cable is reeled up in the space 8, and is unreeled during rotation in the other direction. It exits the housing 1 through an opening (not shown) and is connected outside of the housing with a tow bar or other skier-supporting member (not shown). Also firmly attached to the shaft 4, and therefore rotatable therewith, is a turbine-type pump impeller 10, which on both sides is respectively provided with a set of impeller blades, namely, with the cable withdrawal blades 11 and the cable retraction blades 12. Opposite the withdrawal blades 11 of the pump impeller 10 is positioned a corresponding set of withdrawal blades 13 of the stator 3; opposite the retraction blades 12 is positioned a corresponding set of retraction blades 14, which is stationarily mounted in the housing cover 15, which is fastened to the housing 1 by means of screws 16.

In FIG. 2, the arrangement of individual blades to one another is illustrated, namely, a blade 11' (withdrawal blades 11), a blade 12' (retraction blades 12) a blade 13' (withdrawal blades 13) and a blade 14' (retraction blades 14).

As is visible from FIG. 2, all of the blades are inclined with respect to the axis of rotation A of the shaft 4 by an angle α, which in the illustrated embodiment amounts to 30°. The angle α is such that the withdrawal impeller blades are inclined in a direction extending towards their tangential direction of motion 20 that results when the cable moves in the withdrawal direction, and such that the retraction blades are inclined in a direction extending towards their tangential direction of motion 21 that results when the cable moves in the retraction direction, as can be seen in FIG. 2.

In the housing cover 2, there is also arranged a draw spring 17, which is merely shown schematically. It is constructed as a coil spring and is anchored at its one end in the housing cover 2 and at its other end in the rotating shaft 4.

The space between the housing cover 15 and the stator 3 and therefore also both of the subspaces formed by the sets of blades positioned respectively opposite from one another are filled with an hydraulic braking medium which makes possible a momentum exchange as a result of relative movement between the blades 11 and 13 and/or 12 and 14, which medium preferably is mineral oil.

If the towing cable 9 runs off of the cable drum 7, then the cable drum is set in motion, with it the shaft 4 and with this in its turn the pump impeller 10 in the direction of the illustrated arrow 20 (withdrawal direction). On the other hand, if the towing cable 9 is retracted, then the cable drum 7 is set in motion, the shaft 4 and with it the pump impeller 10 in the direction of the illustrated arrow 21 (retracting direction). In the case of withdrawal of the cables, when a person is carried along by one of the tow bars fastened on the end of the towing cable and this tow bar is thereby drawn out, the cable drum 7 and with it the pump impeller 10 is rotated against the force of the spring 17 in the direction of the arrow 20. If, in the case of a withdrawn cable, the tow bar is released by the person being towed, then the towing cable 9 is again retracted by the draw spring 17.

As a result of the inclination of the blades 11' and 13', there results now with rotation of the pump impeller 10 in the withdrawal direction (arrow 20) an essentially higher braking torque by means of a momentum exchange between the rotating pump impeller 10 and the stator disc 3, than in the case of rotation in the retracting direction (arrow 21). This results from the fact that the direction of flow with which the hydraulic fluid goes out of the turbine wheel 10 during rotation into the pump impeller 3 lies essentially parallel to the course of the blades 13' during rotation in the direction of the arrow 20, therefore no so-called "shock losses" arise. On the other hand, with rotation in the retracting direction, the shock losses become very high and the momentum exchange is correspondingly small. Therefore, in the withdrawal direction, there operates against the withdrawal of the towing cable, in addition to the force of the draw spring 17, a high braking torque between the pump impeller 10 and the stator 3, whereas in the retracting direction (arrow 21), the draw spring 17 must merely overcome a comparatively very small braking torque between turbine wheel 10 and stator 3.

The relationship of the braking torque in the withdrawal direction to that in the retraction direction is in the illustrated embodiment dimensioned in such a manner that there arises in the withdrawal direction a braking torque which is as high as possible. Correspondingly, the braking torque produced in the retracting direction is extremely small.

In order to achieve during retraction via the force of spring 17 a sufficiently strong braking effect which prevents slamming up into the housing of a tow bar being drawn into the housing, there are provided the two outer sets of blades, namely, the blades 12 and 14. Since the braking torque to be applied by them is less than the braking torque in the case of withdrawal, the dimensions of the blades 12 and 14 in the radial direction are correspondingly smaller. The sets of blades must be arranged so that only a small braking torque results during rotation in the direction of the arrow 20 (withdrawal direction), whereas, there results by rotation in the direction of arrow 21 (retracting direction), on the other hand, a greater braking torque, which is of value suitable for braking of an empty tow bar during retraction into the housing by means of reeling up the cable drum 7.

As the angle $\alpha$ of the blades with respect to the axis A, there comes into consideration an angle of approximately 20° to 35°; an angle of $\alpha = 30°$ has proven to be an especially advantageous value.

The previously mentioned use of mineral oil as the medium for the momentum exchange between the sets of blades is important, because mineral oil has distinguished itself as medium which displays a sufficient constancy of viscosity under the temperature conditions at which ski lifts are employed ($-30°$ to $+10°$ C.). If one were to employ, for example, oil as the medium, the braking torques would be too varied at the different temperatures coming into question (at $+10°$ C. the braking torque would be too small; at $-30°$ C. the draw spring 17 would be too weak to overcome the braking torque in the retracting direction).

Reference is also to be made to the property of the illustrated braking device, namely, that the braking torque builds up only with an increasing rate of revolution, so that the braking effect is not very strong, respectively, at the beginning of the withdrawal operation, therefore at a standstill and/or initial movement of the pump impeller 10, whereas it becomes greater with increasing rate of revolution, therefore with increasing withdrawal. In this manner, sharp impacts during initial towing are eliminated.

In order to improve this effect to still a greater degree, there are provided separating plates 30 and 31 on both of the sets of blades 11 and 13 on the pump impeller 10 and on the stationary turbine wheel 3. They prevent a momentum exchange, during initial rotation, between the medium in the two sets of blades positioned opposite with respect to each other at this point. The momentum exchange sets in, rather, only when the rate of revolution has increased so far that an acceleration of the medium in the radial direction is produced, so that then a momentum exchange occurs on the radially outer sides of the separating plates.

The housing is additionally provided with a fastening plate 40 which serves for fastening onto the cable of a tow-type ski lift or onto supporting devices fastened to the cable.

What is claimed is:

1. A device for the braking of a towing cable in a tow-type ski lift, comprising a rotatable drum for carrying the towing cable, means associated with said drum for rotatably biasing said drum in one direction, whereby the tow cable is withdrawable from said drum against the force of said biasing means and is retractable about said drum by virtue of said biasing force, and means for hydraulically braking the withdrawal and retraction of the tow cable, said hydraulic braking means comprising a braking fluid impeller means rotatable with said drum and including a first set of impeller blade members, and a first relatively stationary stator disc having a first set of stator blade members cooperatively arranged adjacent the first set of impeller blade members, said first set of impeller and stator blade members all being equally inclined a predetermined angle with respect to the axis of rotation of the impeller means, the predetermined angle being such that braking force is generated when the drum is rotated in the cable withdrawal direction and such braking force is not substantially generated when the drum is rotated in the cable retraction direction; a second set of impeller blade members on said impeller means; and a second set of relatively stationary stator blade members cooperatively arranged adjacent the second set of impeller blade members, said second set of impeller and stator blade members being also equally inclined a predetermined angle with respect to the axis of rotation of the impeller means, the second set of impeller and stator blade members having a smaller radial dimension than the first set of impeller and stator blade members, the latter of said predetermined angles being such that braking force is generated when the drum is rotated in the cable retraction direction, and such braking force is not substantially generated in the cable withdrawal direction, whereby the braking action generated by said first set of impeller and stator blade members is greater than that generated by the second of said impeller and stator blade members when both impellers are rotated at the same speed, and whereby substantial braking forces are not generated by each respective impeller and stator blade set when braking forces are generated by the other impeller and stator blade set.

2. The device of claim 1, wherein the first and second set of impeller blade members are disposed on opposite sides of the rotor means.

3. The device of claim 2, wherein the said predetermined angles of the impeller and stator blade members relative to the axis of rotation of the impeller means are equal.

4. The device according to claim 1, wherein the said predetermined angles lie between 25° and 35°.

5. The device in accordance with claim 1, wherein the hydraulic braking fluid is mineral oil.

* * * * *